United States Patent
Noda et al.

(10) Patent No.: US 9,904,272 B2
(45) Date of Patent: Feb. 27, 2018

(54) NUMERICAL CONTROLLER CAPABLE OF REDUCING MACHINE LOAD

(71) Applicant: FANUC Corporation, Minamitsuru-gun, Yamanashi (JP)

(72) Inventors: Kouichi Noda, Minamitsuru-gun (JP); Takahiko Endo, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 236 days.

(21) Appl. No.: 15/017,855

(22) Filed: Feb. 8, 2016

(65) Prior Publication Data

US 2016/0239017 A1    Aug. 18, 2016

(30) Foreign Application Priority Data

Feb. 18, 2015   (JP) ................................. 2015-029824

(51) Int. Cl.
*G06F 19/00* (2011.01)
*G05B 19/406* (2006.01)

(52) U.S. Cl.
CPC .. *G05B 19/406* (2013.01); *G05B 2219/39086* (2013.01)

(58) Field of Classification Search
CPC .................... G05B 19/406; G05B 2219/39086
See application file for complete search history.

(56) References Cited

U.S. PATENT DOCUMENTS

2006/0116786 A1   6/2006  Iwashita et al.
2010/0264867 A1  10/2010  Iwashita et al.

FOREIGN PATENT DOCUMENTS

| JP | H10309649 A | 11/1998 |
| JP | 20060116786 A1 | 6/2006 |
| JP | 2010-250697 A | 11/2010 |

OTHER PUBLICATIONS

Decision to Grant a Patent dated Jan. 27, 2017 in Japanese Application No. 2015-029824 (3 pages) with English Translation (3 pages).

*Primary Examiner* — Thomas Lee
*Assistant Examiner* — Zhipeng Wang
(74) *Attorney, Agent, or Firm* — Drinker Biddle & Reath LLP

(57) ABSTRACT

A numerical controller obtains a maximum value of an impact produced in a machine during execution of a machining program, identifies an acceleration/deceleration time constant at a point where the maximum value of the impact is generated, based on command data, if the obtained value exceeds a threshold, changes the identified time constant, and recalculates a cycle time of the machining program based on the changed time constant. If the cycle time is within a preset tact time, the changed time constant is stored in advance in association with an identified command block so that it is referred to during the execution of the machining program.

5 Claims, 9 Drawing Sheets

NUMERICAL CONTROLLER CAPABLE OF REDUCING MACHINE LOAD

RELATED APPLICATION DATA

This application claims priority under 35 U.S.C. § 119 and/or § 365 to Japanese Application No. 2015-029824 filed Feb. 18, 2015, the entire contents is incorporated herein by reference.

BACKGROUND OF THE INVENTION

Field of the Invention

The present invention relates to a numerical controller capable of reducing machine load.

Description of the Related Art

Normally, in adjusting the acceleration and deceleration of a feed shaft and a spindle of a machine, the time required for the acceleration and deceleration is set as short as possible. By doing this, the cycle time of an entire machining program can be minimized. The higher the acceleration, however, the greater the mechanical shock is, resulting in a reduction in the life of the machine. A technique disclosed in Japanese Patent Application Laid-Open No. 2010-250697 is known as a conventional technique for automatically adjusting acceleration and deceleration.

As shown in FIG. 9, on the other hand, cycle times (hereinafter referred to as "tact times") required for individual processes are settled in an automobile manufacturing line or the like. Since machining should only be finished within these tact times, shorter cycle times are not always preferable. In some cases, therefore, the time required for acceleration and deceleration should rather be increased, as long as it does not exceed the tact time, to minimize loads on the feed shaft and the spindle, thereby reducing the gradient of acceleration and deceleration.

Conventionally, manual adjustment is needed to set a large acceleration/deceleration time constant in order to reduce the gradient of acceleration and deceleration, and it is difficult to achieve the adjustment on the spot. According to the technique disclosed in Japanese Patent Application Laid-Open No. 2010-250697, the acceleration and deceleration can be automatically adjusted. However, this technique is designed to adjust the acceleration/deceleration time constant to achieve energy conservation, based on the correlation between the cycle time and the sum total of motor load currents and power consumptions of peripheral equipment, not considering suppression of vibration and shock on a machine.

Further, a conventional technique can be used to suppress vibration and chattering of a machine by automatically and dynamically changing the feed speed in accordance with a PMC ladder program or the like, based on input information on an impact sensor or motor load currents. According to this technique, however, no consideration is given to cycle times finally required by such a dynamic change of the feed speed.

SUMMARY OF THE INVENTION

Accordingly, the object of the present invention is to provide a numerical controller capable of minimizing an impact produced in a machine while restricting the machining time within a tact time.

A numerical controller according to the present invention is configured to control a machine in accordance with a machining program and comprises a program analysis unit configured to analyze the machining program and output command data, an impact analysis unit configured to analyze historical data indicative of the magnitude of an impact produced in the machine during execution of the machining program and obtain a maximum value of the impact during the execution of the machining program, a first determination unit configured to determine whether or not the maximum value of the impact analyzed by the impact analysis unit exceeds a preset first threshold, an acceleration/deceleration time constant identification unit configured to identify a command block during runtime when the maximum value of the impact is generated, based on the command data, if it is determined by the first determination unit that the maximum value of the impact exceeds the first threshold and to identify an acceleration/deceleration time constant at a point where the maximum value of the impact is generated, an acceleration/deceleration time constant changing unit configured to change the acceleration/deceleration time constant by using a preset time constant adjustment value, a cycle time recalculation unit configured to calculate a cycle time of the machining program based on the acceleration/deceleration time constant changed by the acceleration/deceleration time constant changing unit, and an update time constant storage unit configured to determine whether or not the cycle time calculated by the cycle time recalculation unit is within a preset tact time and store the changed acceleration/deceleration time constant in association with the identified command block if the cycle time is within the tact time.

The magnitude of the impact may be identified by an impact value measured by an impact sensor.

The numerical controller may further comprise a motor load analysis unit configured to analyze motor load historical data indicative of a load of a motor attached to the machine during the execution of the machining program and obtain a maximum value of the motor load within an acceleration and deceleration range at the point where the maximum value of the impact is generated and a second determination unit configured to determine whether or not the maximum value of the motor load analyzed by the motor load analysis unit exceeds a preset second threshold, and the acceleration/deceleration time constant changing unit may be configured to change the identified acceleration/deceleration time constant by using a preset time constant adjustment value if it is determined by the second determination unit that the maximum value of the motor load exceeds the second threshold.

The magnitude of the impact may be identified by a motor load.

Further, a numerical control system according to the present invention is configured so that at least two numerical controllers are connected by a communication line, and the numerical controllers individually control machines in accordance with machining programs. The numerical control system comprises a program analysis unit configured to analyze the machining programs and output command data, an impact analysis unit configured to analyze historical data indicative of the magnitudes of the impacts produced in the machines during execution of the machining programs and obtain maximum values of the impacts during the execution of the machining programs, a first determination unit configured to determine whether or not the maximum values of the impacts analyzed by the impact analysis unit exceed a preset first threshold, an acceleration/deceleration time constant identification unit configured to identify the machining programs in which the maximum values of the impacts are generated and command blocks during runtime when the maximum values of the impacts are generated, based on the command data, if it is determined by the first determination unit that the maximum values of the impacts exceed the first threshold and to identify acceleration/deceleration time constants at points where the maximum values of the impacts are generated, an acceleration/deceleration time constant changing unit configured to change the acceleration/deceleration time constants by using a preset time constant adjustment value, a cycle time recalculation unit configured to calculate the sum total of cycle times of the machining programs based on the acceleration/deceleration time constants changed by the acceleration/deceleration time constant changing unit, and an update time constant storage unit configured to determine whether or not the sum total of the cycle times calculated by the cycle time recalculation unit is within a preset tact time and store the changed acceleration/deceleration time constants in association with the identified machining programs and the identified command blocks if the sum total of the cycle times is within the tact time.

According to the present invention, there can be provided a numerical controller capable of minimizing an impact produced in a machine while restricting the machining time within a tact time, whereby aging degradation of the machine can be suppressed, and hence, the equipment cost can be reduced.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

According to the present invention, a test run is performed with a tact time of an entire machining program given in advance, and the loaded conditions of a feed shaft and a spindle for the entire machining program and a value in an impact sensor attached to a machine are recorded as historical data. The impact sensor mentioned here is a sensor that can detect the acceleration of a moving object.

Figure 1:
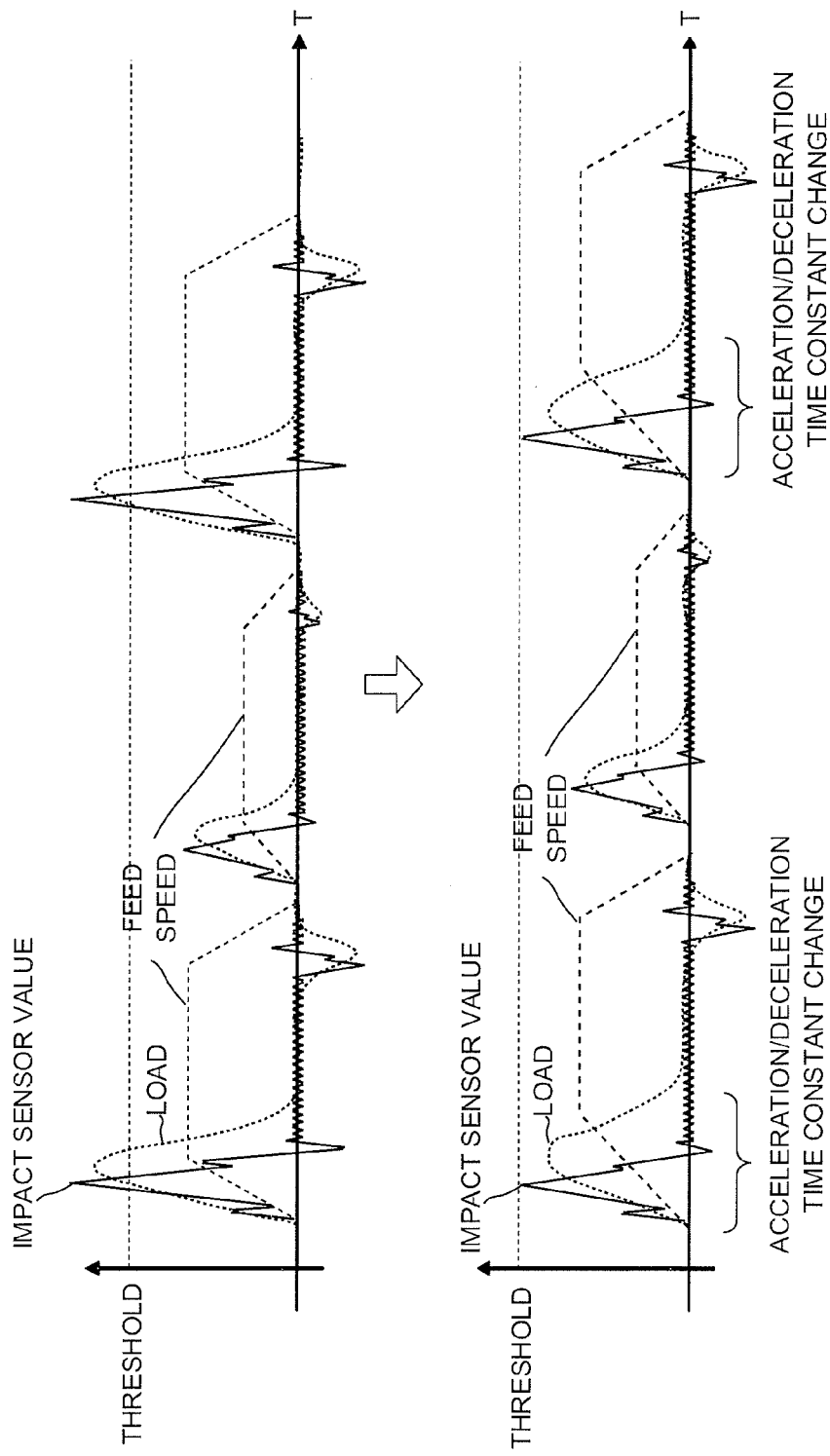
FIG. 1 is a diagram illustrating an outline of a method for changing an acceleration/deceleration time constant according to the present invention.

If the cycle time is within the previously given tact time and can be extended without a problem, a portion where the value in the impact sensor is large (e.g., a portion where the value exceeds a threshold) is detected, as shown in FIG. 1, and the acceleration or deceleration time (necessary time for acceleration or deceleration) for the detected point is changed so as to increase within such a range that the cycle time does not exceeds the tact time. Change information on a time constant of the acceleration and deceleration may be recorded on an internal memory or otherwise embedded as a command in the machining program. In the next and subsequent operation cycles, the machining program is executed by using the thus recorded time constant of the acceleration and deceleration.

In the case of a machine that is not provided with an impact sensor, a high impact is liable to act on the machine at a point where the motor load is high. Therefore, the load on the machine can be reduced by focusing on the motor load only and increasing the time for acceleration and deceleration at the point where the motor load is high. Specifically, a portion where the motor load on the feed shaft or the spindle is high is detected, and the acceleration/deceleration time constant is changed so as to increase the acceleration or deceleration time for the detected point within such a range that the cycle time does not exceeds the tact time. The load on the machine is reduced by executing the machining program using the changed acceleration/deceleration time constant in the next and subsequent operation cycles.

Figure 2:
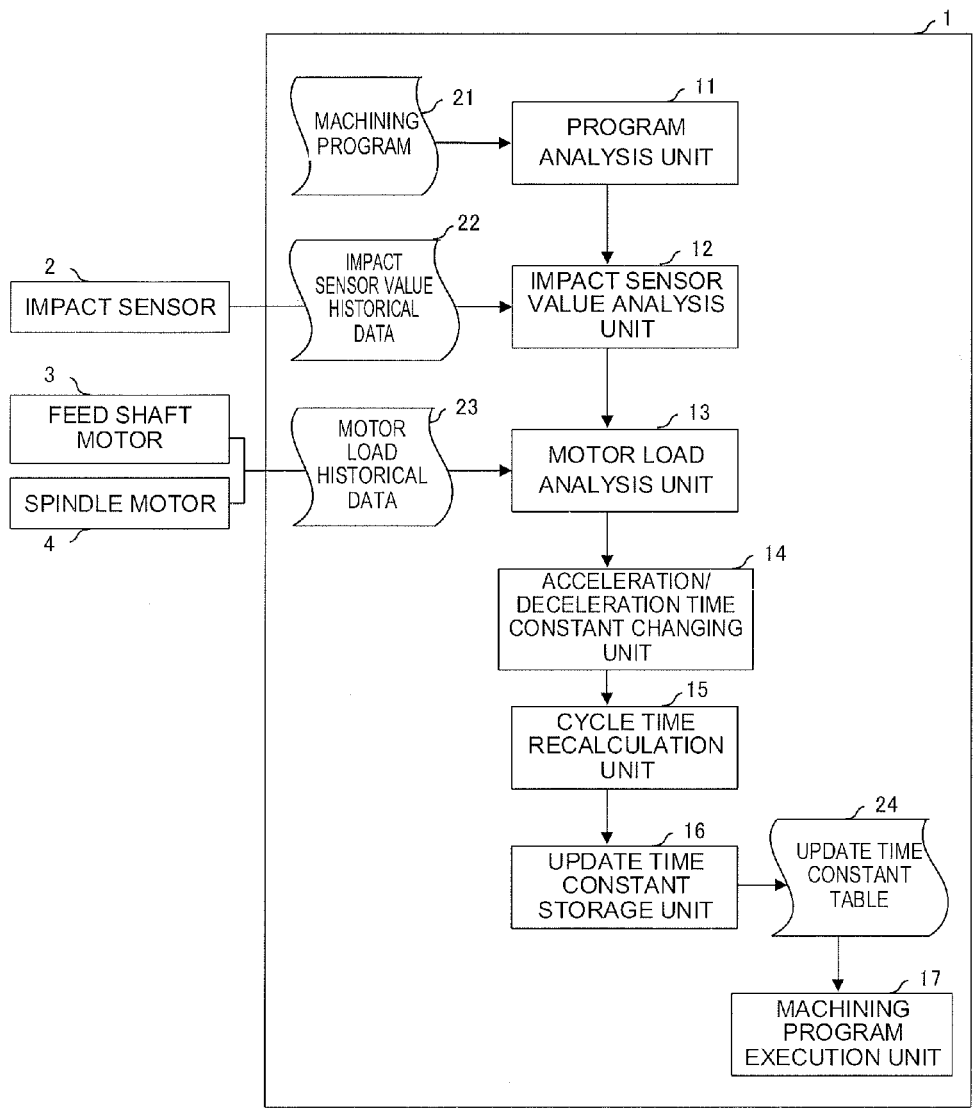
FIG. 2 is a block diagram of a numerical controller according to one embodiment of the present invention.

FIG. 2 is a functional block diagram of a numerical controller (CNC) according to one embodiment of the present invention, configured to change acceleration and deceleration at the point where the value in the impact sensor is large.

A numerical controller 1 of the present embodiment comprises a program analysis unit 11, impact sensor value analysis unit 12, motor load analysis unit 13, acceleration/deceleration time constant changing unit 14, cycle time recalculation unit 15, update time constant storage unit 16, and machining program execution unit 17.

The program analysis unit 11 reads a machining program 21 stored in a memory in the numerical controller 1 and analyzes the read machining program 21 to create command data.

The impact sensor value analysis unit 12 determines, based on impact sensor value historical data 22 on which an output from an impact sensor 2 is recorded, whether or not there is a portion where a previously specified threshold is exceeded when the machining program 21 is executed in advance.

The motor load analysis unit 13 determines, based on motor load historical data 23 on which loads on a feed shaft motor and a spindle motor are recorded, whether a previously specified motor load threshold is not exceeded when the machining program 21 is executed in advance.

The acceleration/deceleration time constant changing unit 14 determines, based on the command data created by the program analysis unit 11, whether or not the point where the threshold is determined to be exceeded by the impact sensor value analysis unit 12 or the motor load analysis unit 13 is an acceleration/deceleration execution portion. If the determined point is the acceleration/deceleration execution portion, the time constant of acceleration and deceleration is increased at a previously specified rate.

The cycle time recalculation unit 15 recalculates the cycle time of the machining program 21 based on the time constant changed by the acceleration/deceleration time constant changing unit 14.

The update time constant storage unit 16 stores, in an update time constant table 24, the time constant changed by the acceleration/deceleration time constant changing unit 14 in association with an execution point of the machining program 21.

The machining program execution unit 17 executes the machining program 21 according to the time constant stored in the update time constant table 24 by the update time constant storage unit 16.

The following is a description of the operation of the numerical controller 1 shown in FIG. 2. In the numerical controller 1, the respective motor load currents of a feed shaft motor 3 and a spindle motor 4 and information on the impact sensor 2 of the machine are first automatically obtained during the execution of the machining program 21.

For a point where the detection value of the impact sensor 2 exceeds a predetermined threshold, the time constant of acceleration and deceleration is extended at a predetermined rate or by a predetermined value if the execution time of the machining program is within a previously given tact time. The extended time constant of acceleration and deceleration or its variation is stored in advance in the update time constant table 24 in association with the execution point of the machining program 21. During the execution of the machining program 21, the acceleration and deceleration are changed with reference to the update time constant table 24. Instead of storing, in the update time constant table 24, the information on the thus changed time constant of acceleration and deceleration, the information may be embedded as a command in the machining program 21.

The following is a description of an operation example of the present embodiment.

Figure 3:
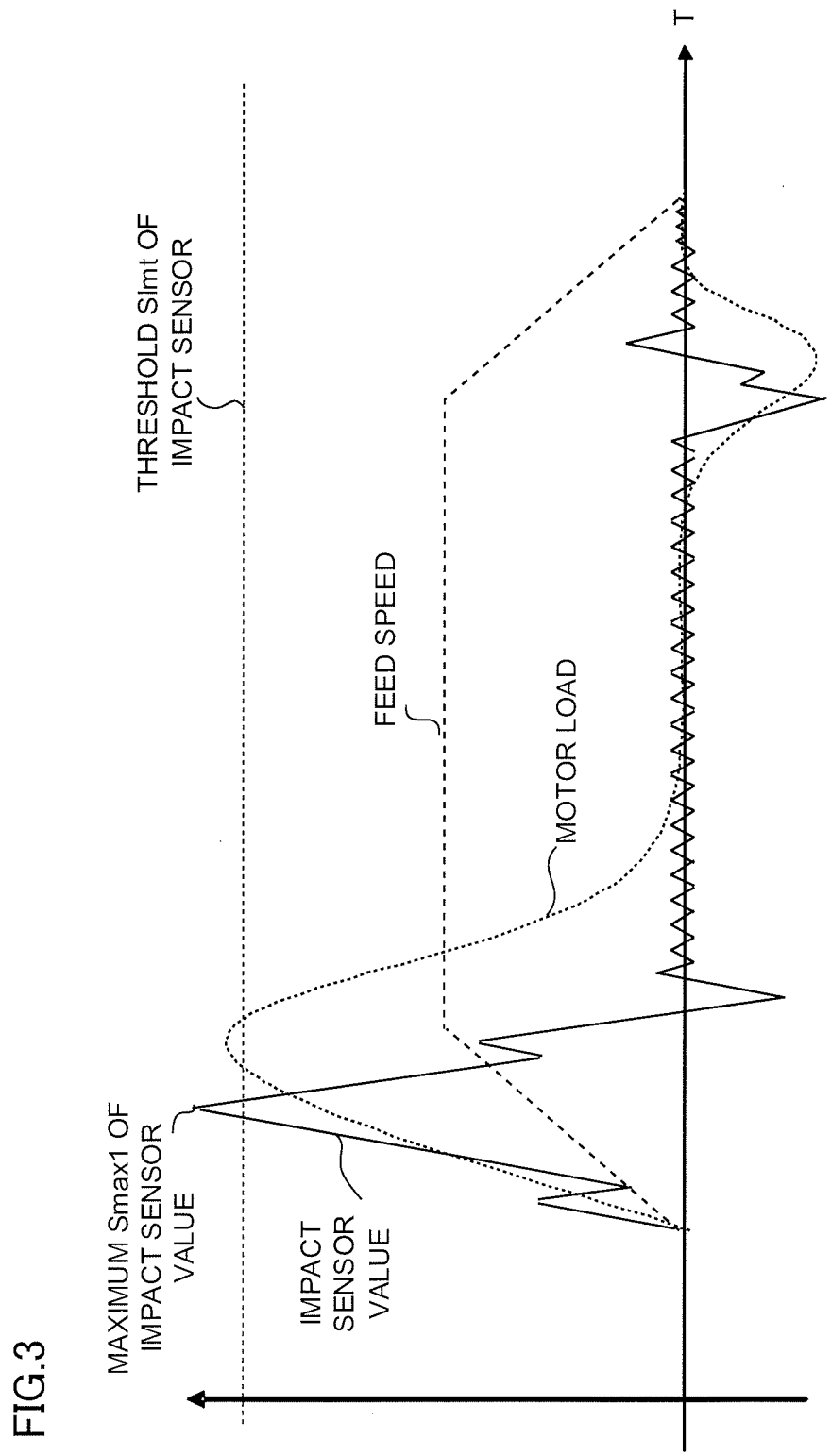
FIG. 3 is a diagram showing the relationships between a motor feed speed, impact sensor value, and motor load according to a first embodiment of the present invention.

As shown in FIG. 3, a value $S_{max1}$ at a point where the detection value of the impact sensor 2 is maximal is obtained from the impact sensor value historical data 22 stored when the machining program 21 is executed in advance. Then, it is determined whether the obtained detection value $S_{max1}$ does not exceed a previously specified threshold $S_{lmt}$ of the impact sensor 2. Since the detection value of the impact sensor 2 may sometimes be negative, it is necessary, in such a case, to ascertain whether the threshold is not exceeded by a negative maximum value.

Figure 4:
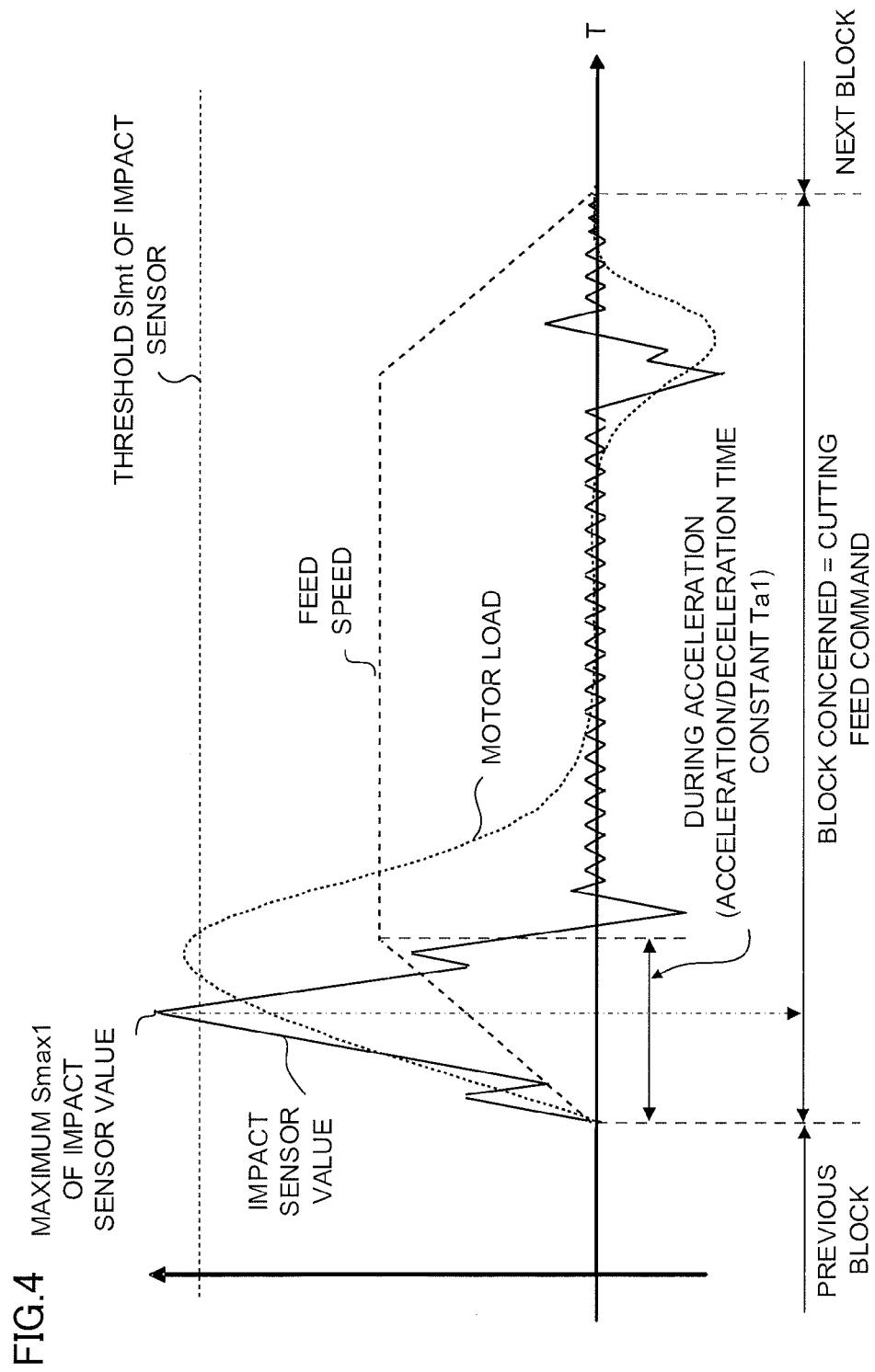
FIG. 4 is a diagram showing the relationships between the impact sensor value and blocks of a machining program according to the first embodiment of the present invention.
Figure 5:
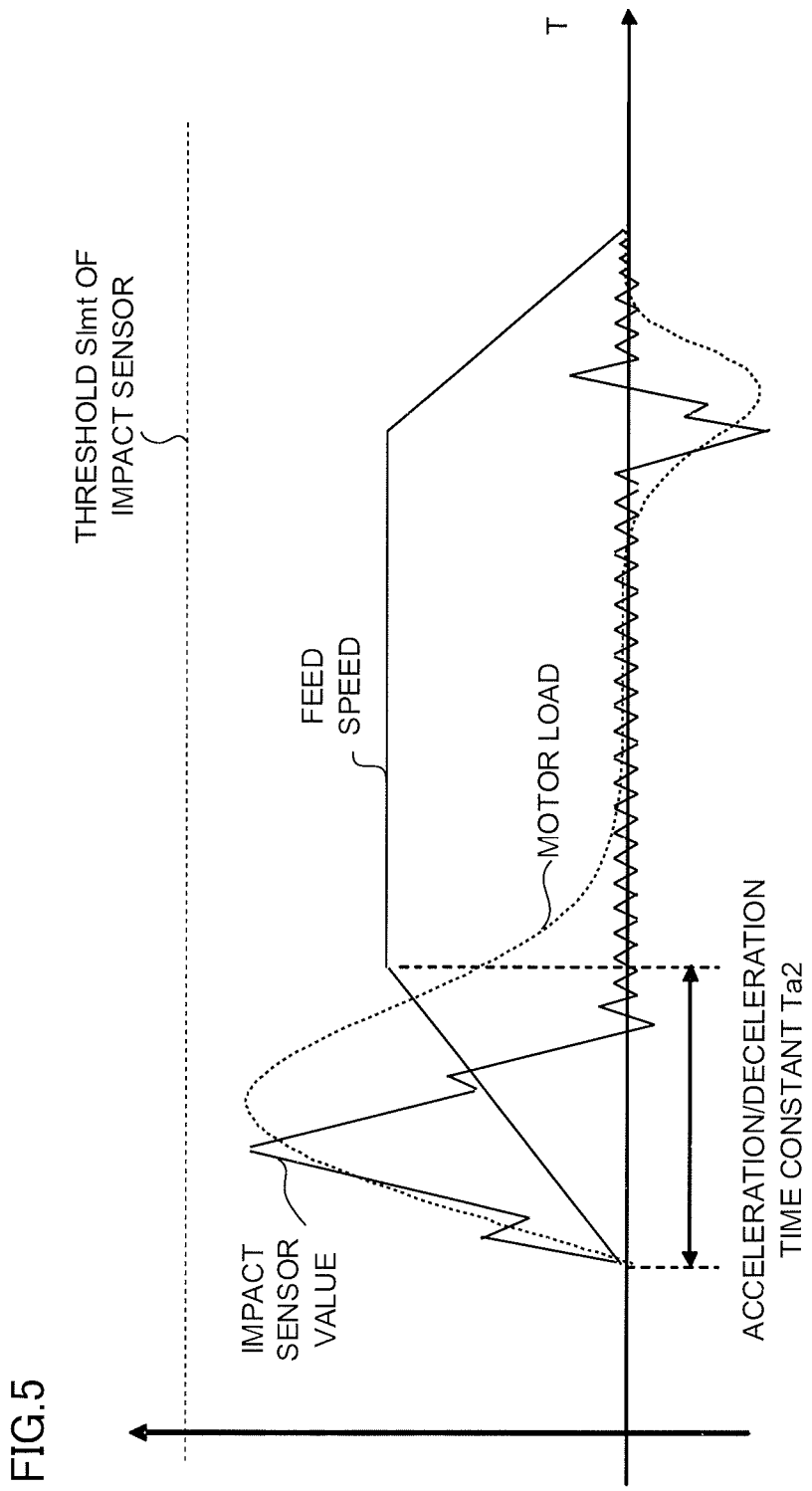
FIG. 5 is a diagram showing the relationships between a feed speed, impact sensor value, and motor load after adjustment of the acceleration/deceleration time constant according to the first embodiment of the present invention.

If the detection value $S_{max1}$ of the impact sensor 2 exceeds the threshold $S_{lmt}$, as shown in FIG. 4, a running command block in the machining program to which the point where the value $S_{max1}$ is detected corresponds is identified and it is determined, based on the command concerned and the changing state of the feed speed, whether or not the detection point is in the course of acceleration or deceleration.

If the detection point is in the course of acceleration or deceleration, an acceleration/deceleration time constant $T_{\alpha 1}$ is obtained. The acceleration/deceleration time constant is changed in order to reduce the motor load to suppress impact. In a case where a previously specified rate of increase $\alpha$ of the time constant is used for changing the acceleration/deceleration time constant, the value of the acceleration/deceleration time constant is changed according to, for example, the following equation (1). In equation (1), $T_{\alpha 2}$ and $\alpha$ represent a changed time constant and a previously specified increment of the time constant, respectively.

$$T_{\alpha 2}=T_{\alpha 1}\times(1+\alpha). \tag{1}$$

Thereafter, the cycle time is calculated based on the changed acceleration/deceleration time constant $T_{\alpha 2}$. Methods for storing the changed acceleration/deceleration time constant and estimating the cycle time from the stored acceleration/deceleration time constant can be achieved by the aforementioned means disclosed in Japanese Patent Application Laid-Open No. 2010-250697 and the like.

If the cycle time calculated from the changed acceleration/deceleration time constant $T_{\alpha 2}$ does not exceed a previously specified tact time, a value $S_{max2}$ at a point where the value in the impact sensor is the second largest, among the impact sensor value historical data 22, is then obtained, and it is determined whether the value $S_{max2}$ does not exceed the value $S_{lmt}$. Based on the result of the determination, processing for changing the time constant is performed in the same manner as aforesaid. This procedure is repeated so that there is no point where the threshold $S_{lmt}$ is exceeded or so that the calculated cycle time becomes longer than the tact time.

Even when the calculated cycle time is longer than the tact time, the load on the machine can be minimized by using the time constant that is obtained by reducing the rate of increase $\alpha$ described in equation (1) to, for example, $(\frac{1}{2})\times\alpha$ so that the cycle time is within the tact time.

Machining with a reduced load on the machine can be achieved by performing the next machining cycle based on the changed acceleration/deceleration time constant calculated in this manner.

Even when the detection value of the impact sensor 2 exceeds the previously specified threshold $S_{lmt}$, the impact possibly may not be produced by operating the feed shaft or spindle, but may be produced due to operation of some other peripheral equipment.

Figure 6:
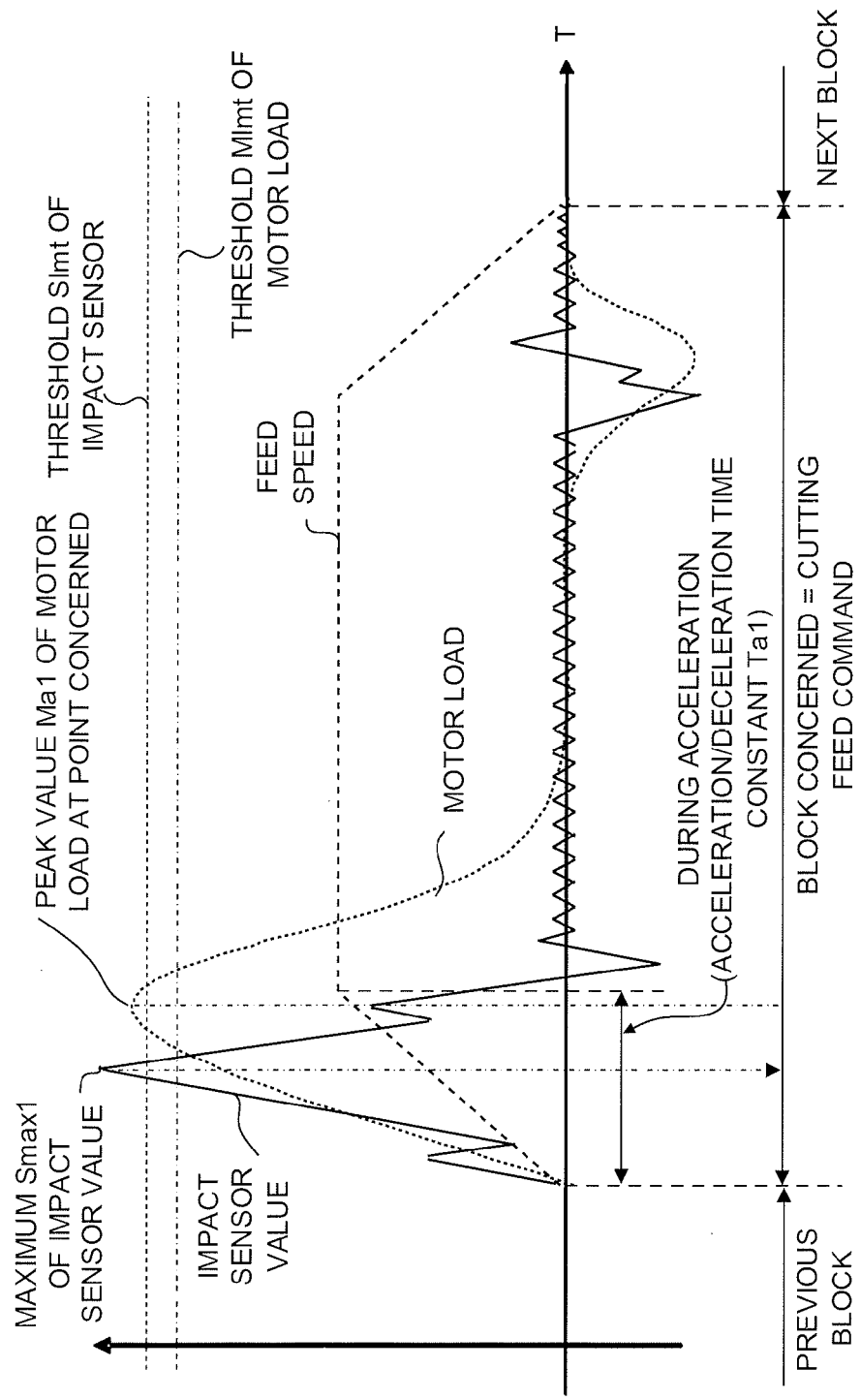
FIG. 6 is a diagram showing the relationships between an impact sensor value, motor load, and blocks of a machining program according to a second embodiment of the present invention.
Figure 7:
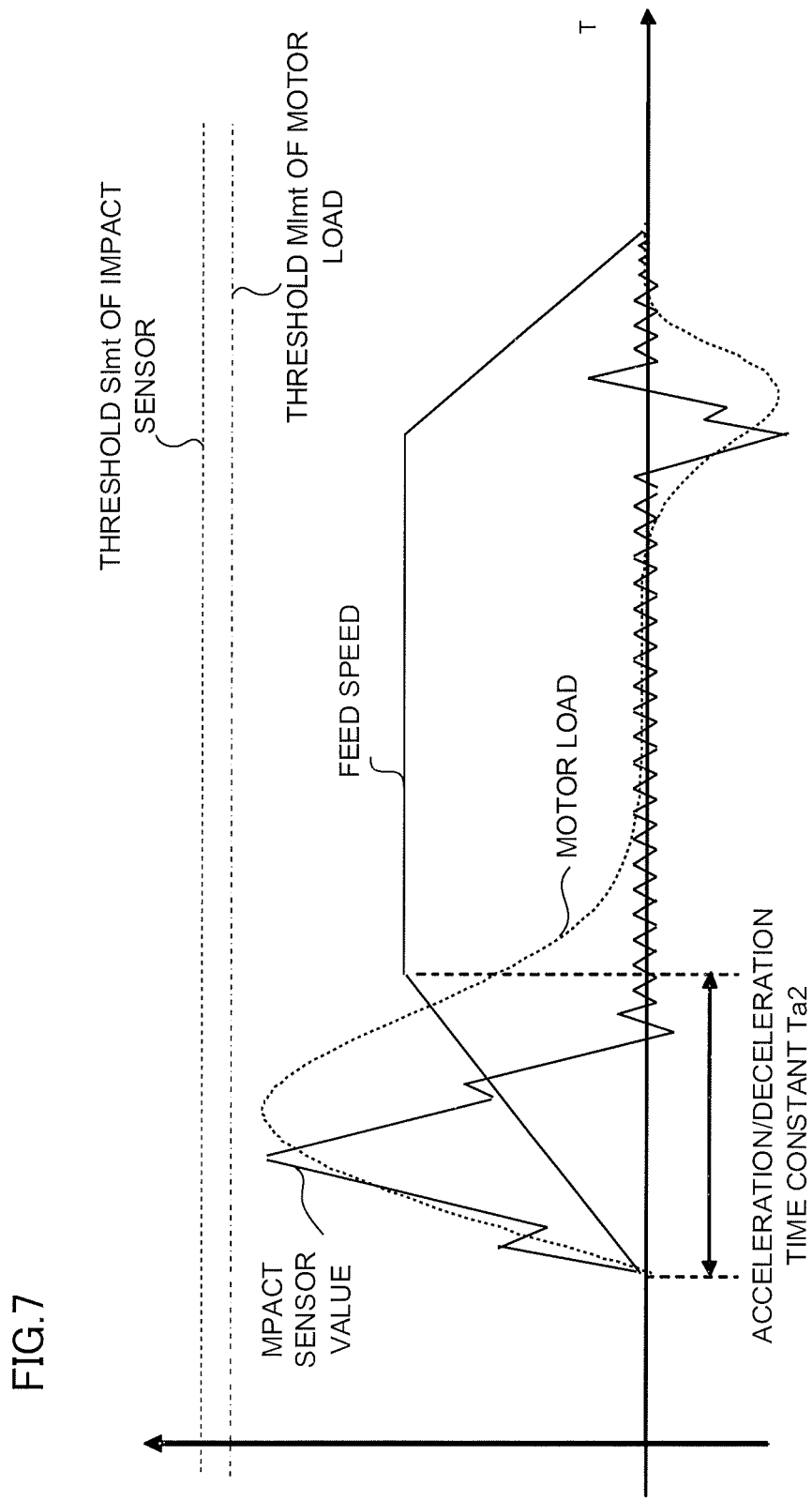
FIG. 7 is a diagram showing the relationships between a feed speed, impact sensor value, and motor load after adjustment of the acceleration/deceleration time constant according to the second embodiment of the present invention.

In such a case, a peak value $M_{a1}$ of the motor load corresponding to a block in which $S_{max1}$ exceeds $S_{lmt}$ and a previously specified threshold $M_{lmt}$ of the motor load are compared with each other. If the peak value $M_{a1}$ of the motor load corresponding to the block concerned does not exceed the threshold $M_{lmt}$, the impact is not determined to be produced by an acceleration or deceleration of the motor and is excluded from the object of change for the acceleration/deceleration time constant. In contrast, if the peak value $M_{a1}$ of the motor load corresponding to the block concerned exceeds the threshold $M_{lmt}$, as shown in FIG. 6, the acceleration/deceleration time constant is changed according to equation (1), as shown in FIG. 7.

Since the value of the motor load may sometimes be negative, it is necessary, in such a case, to ascertain whether the threshold is not exceeded by a negative peak value.

The above-described method is also applicable to a machine that is not provided with the impact sensor 2. In the case of the machine without the impact sensor 2, information on the motor load currents of the feed shaft motor 3 and the spindle motor 4 is first automatically obtained during the execution of the machining program 21.

If the execution time of the machining program is within the previously given tact time, the time constant of acceleration and deceleration is extended at the predetermined rate or by the predetermined value for a point where the value of the motor load current exceeds a predetermined threshold. The time constant of acceleration and deceleration associated with the execution point of the machining program 21 or its variation is stored in advance in the update time constant table 24 so that the machining program can be executed with reference to the same. Alternatively, the machining program 21 is changed based on the changed acceleration/deceleration time constant.

Although the above-described processing is the same as the processing for the case in which historical data on the impact sensor 2 is recorded, determination of the value of the impact sensor is not made. Instead, attention is paid to the motor load, and the time constant is changed by sequential retrieval starting from the maximum value of the motor load.

In the processing described above, the cycle time is restricted within the tact time, focusing on the single numerical controller. However, the present invention is also applicable to a case in which the sum total of the cycle times of a plurality of controllers or an entire line is expected to be restricted within a predetermined time (total tact time).

For example, communication means is provided between the numerical controllers, the maximum impact sensor value for all the numerical controllers concerned is determined, and the time constant is changed for a point corresponding to the maximum impact sensor value. The cycle times of the controllers are calculated based on the changed time constant. If the sum total of the calculated cycle times and the cycle times of the other controllers does not exceed the total tact time, processing for determining the impact sensor value to become maximal next and changing the time constant is performed. This processing is repeated within such a range that the total cycle time does not exceed the total tact time.

Further, if the machine is more influenced despite the use of the same impact sensor value, depending on the difference in machine configuration, the threshold set for each individual controller may possibly be reduced. In such a case, unlike the case in which the change of the time constant is started from the maximum impact sensor value among the controllers, the time constant should preferably be changed starting from a point where the difference between the impact sensor value and the threshold is the largest.

Figure 8:
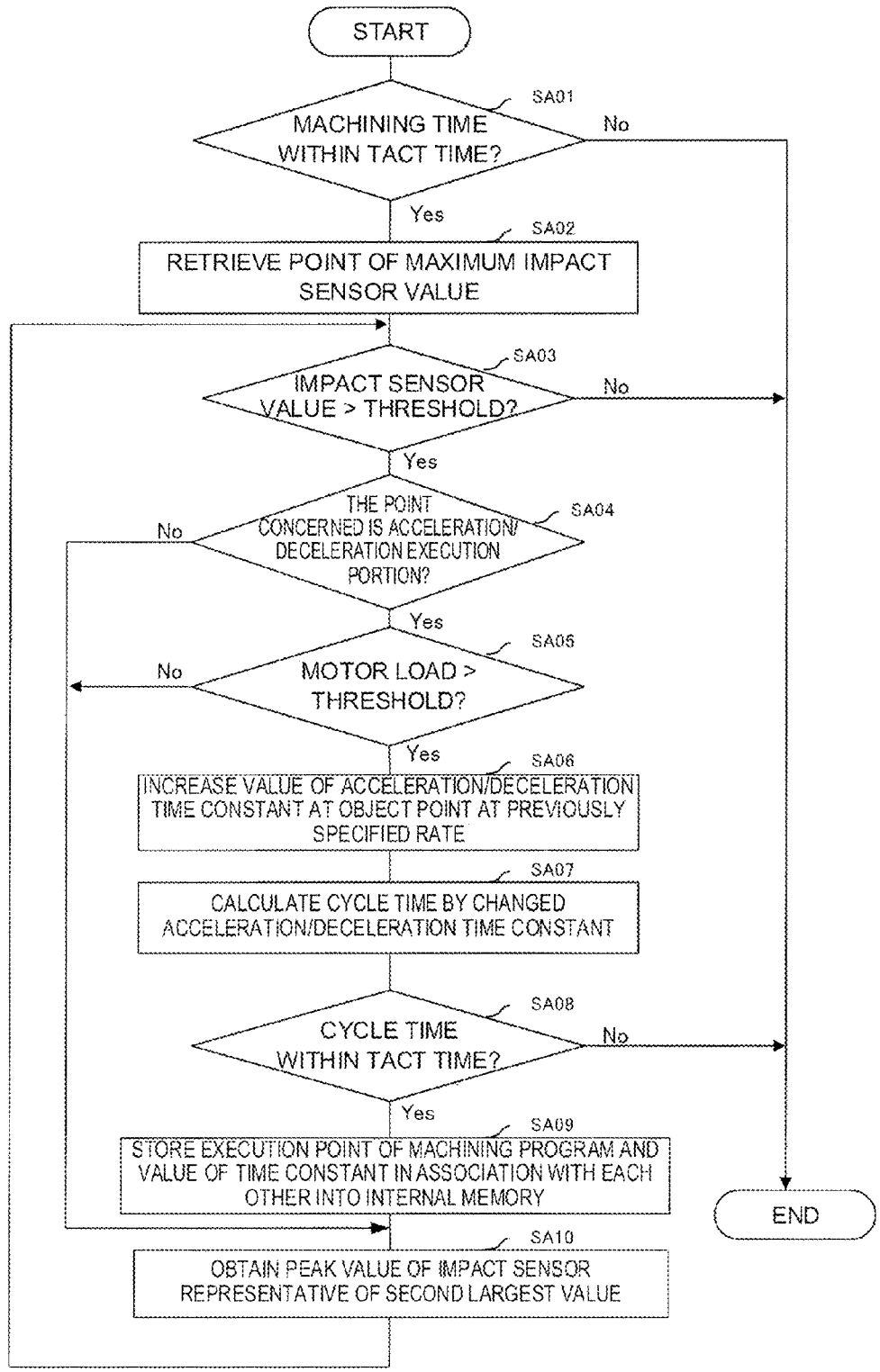
FIG. 8 is a flowchart of processing performed on the numerical controller according to the one embodiment of the present invention.
Figure 9:
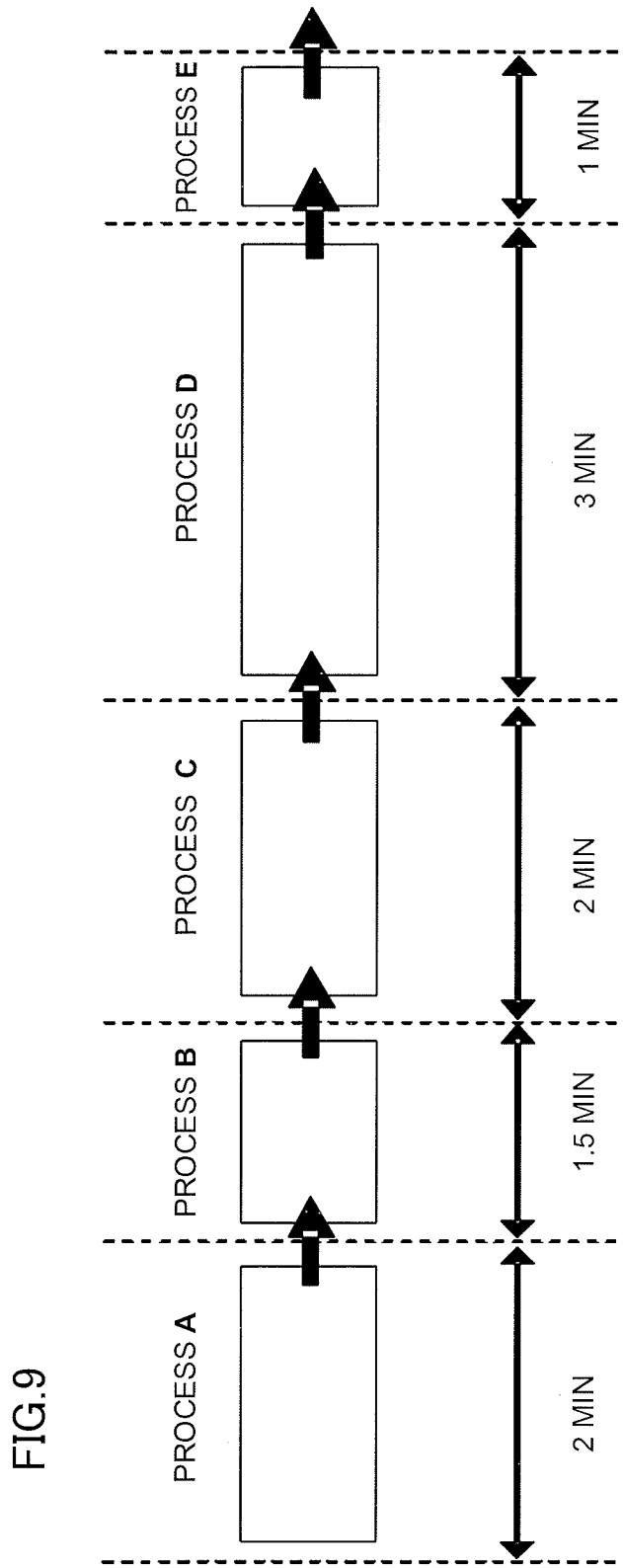
FIG. 9 is a diagram illustrating tact times for machining processes.

FIG. 8 is a flowchart showing processing for changing the acceleration/deceleration time constant performed on the numerical controller 1. The following is a sequential description of various steps of the processing.

[Step SA01] It is determined whether or not the machining time based on the machining program 21 is within the previously given tact time. If the machining time is within the tact time, the processing proceeds to Step SA02. If not, this processing ends.

[Step SA02] The point where the value in the impact sensor is maximal is retrieved with reference to the impact sensor value historical data 22.

[Step SA03] It is determined whether or not the maximum value of the retrieved impact sensor value exceeds the preset threshold $S_{lmt}$ of the impact sensor. If the threshold $S_{lmt}$ is exceeded, the processing proceeds to Step SA04. If not, this processing ends.

[Step SA04] A command block in the machining program which corresponds to a point where the impact sensor value, retrieved in Step SA02, is maximal is identified, and the identified command block is analyzed to determine whether or not the point (hereinafter referred to as "object point") where the impact sensor value is maximal is an acceleration/deceleration execution portion. If the object point is the acceleration/deceleration execution portion, the processing proceeds to Step SA05. If not, the processing proceeds to Step SA10.

[Step SA05] With reference to the motor load historical data 23, it is determined whether or not the motor load exceeds the preset motor load value $M_{lmt}$ at the object point. If the threshold $M_{lmt}$ is exceeded, the processing proceeds to Step SA06. If not, the processing proceeds to Step SA10.

[Step SA06] The value of the acceleration/deceleration time constant at the object point is increased at the previously specified rate.

[Step SA07] The cycle time of the machining program 21 is calculated based on the acceleration/deceleration time constant changed in Step SA06.

[Step SA08] It is determined whether or not the cycle time that is calculated in Step SA07 is within the previously given tact time. If the cycle time is within the tact time, the processing proceeds to Step SA09. If not, this processing ends.

[Step SA09] The execution point (command block identified in Step SA04) of the machining program 21 and the value of the acceleration/deceleration time constant changed in Step SA06 are stored in association with each other into the update time constant table 24 in the internal memory.

[Step SA10] With reference to the impact sensor value historical data 22, the peak value of the impact sensor that represents the second largest value next to the maximum impact sensor value retrieved in Step SA02 is obtained, whereupon the processing returns to Step SA03.

While an embodiment of the present invention has been described herein, the invention is not limited to this embodiment and may be suitably modified and embodied in various forms.

The invention claimed is:

1. A numerical controller configured to control a machine in accordance with a machining program, the numerical controller comprising:
   a program analysis unit configured to analyze the machining program and output command data;
   an impact analysis unit configured to analyze historical data indicative of the magnitude of an impact produced in the machine during execution of the machining program and obtain a maximum value of the impact during the execution of the machining program;
   a first determination unit configured to determine whether or not the maximum value of the impact analyzed by the impact analysis unit exceeds a preset first threshold;
   an acceleration/deceleration time constant identification unit configured to identify a command block during runtime when the maximum value of the impact is generated, based on the command data, if it is determined by the first determination unit that the maximum value of the impact exceeds the first threshold and to identify an acceleration/deceleration time constant at a point where the maximum value of the impact is generated;
   an acceleration/deceleration time constant changing unit configured to change the acceleration/deceleration time constant by using a preset time constant adjustment value;
   a cycle time recalculation unit configured to calculate a cycle time of the machining program based on the acceleration/deceleration time constant changed by the acceleration/deceleration time constant changing unit; and
   an update time constant storage unit configured to determine whether or not the cycle time calculated by the cycle time recalculation unit is within a preset tact time and store the changed acceleration/deceleration time constant in association with the identified command block if the cycle time is within the tact time, wherein the numerical controller is configured to control the machine to perform next and subsequent machining cycles based on the changed acceleration/deceleration time constant when the cycle time is within the preset tact time.

2. The numerical controller according to claim 1, wherein the magnitude of the impact is identified by an impact value measured by an impact sensor.

3. The numerical controller according to claim 1, wherein the magnitude of the impact is identified by a motor load.

4. The numerical controller according to claim 2, further comprising a motor load analysis unit configured to analyze motor load historical data indicative of a load of a motor attached to the machine during the execution of the machining program and obtain a maximum value of the motor load within an acceleration and deceleration range at the point where the maximum value of the impact is generated and a second determination unit configured to determine whether or not the maximum value of the motor load analyzed by the motor load analysis unit exceeds a preset second threshold, wherein the acceleration/deceleration time constant changing unit changes the identified acceleration/deceleration time constant by using a preset time constant adjustment value if it is determined by the second determination unit that the maximum value of the motor load exceeds the second threshold.

5. A numerical control system configured so that at least two numerical controllers are connected by a communication line, in which the numerical controllers individually control machines in accordance with machining programs, the numerical control system comprising:

a program analysis unit configured to analyze the machining programs and output command data;

an impact analysis unit configured to analyze historical data indicative of the magnitudes of the impacts produced in the machines during execution of the machining programs and obtain maximum values of the impacts during the execution of the machining programs;

a first determination unit configured to determine whether or not the maximum values of the impacts analyzed by the impact analysis unit exceed a preset first threshold;

an acceleration/deceleration time constant identification unit configured to identify the machining programs in which the maximum values of the impacts are generated and command blocks during runtime when the maximum values of the impacts are generated, based on the command data, if it is determined by the first determination unit that the maximum values of the impacts exceed the first threshold and to identify acceleration/deceleration time constants at points where the maximum values of the impacts are generated;

an acceleration/deceleration time constant changing unit configured to change the acceleration/deceleration time constants by using a preset time constant adjustment value;

a cycle time recalculation unit configured to calculate the sum total of cycle times of the machining programs based on the acceleration/deceleration time constants changed by the acceleration/deceleration time constant changing unit; and an update time constant storage unit configured to determine whether or not the sum total of the cycle times calculated by the cycle time recalculation unit is within a preset tact time and store the changed acceleration/deceleration time constants in association with the identified machining programs and the identified command blocks if the sum total of the cycle times is within the tact time, wherein the numerical controllers are configured to individually control the machines to perform next and subsequent machining cycles based on the changed acceleration/deceleration time constants when the sum total of the cycle times is within the preset tact time.

* * * * *